US009260148B1

(12) United States Patent
Lee

(10) Patent No.: US 9,260,148 B1
(45) Date of Patent: Feb. 16, 2016

(54) LIGHT UNIT FOR BICYCLE/MOTORBIKE

(71) Applicant: Wen-Sung Lee, Taichung (TW)

(72) Inventor: Wen-Sung Lee, Taichung (TW)

( * ) Notice: Subject to any disclaimer, the term of this patent is extended or adjusted under 35 U.S.C. 154(b) by 0 days.

(21) Appl. No.: 14/552,422

(22) Filed: Nov. 24, 2014

(51) Int. Cl.
*B60Q 1/02* (2006.01)
*B62J 6/00* (2006.01)
*B60Q 1/18* (2006.01)
*B60Q 1/14* (2006.01)
*B62J 6/02* (2006.01)

(52) U.S. Cl.
CPC ............... *B62J 6/001* (2013.01); *B60Q 1/1415* (2013.01); *B60Q 1/18* (2013.01); *B62J 6/02* (2013.01); *B62J 2300/002* (2013.01)

(58) Field of Classification Search
CPC ........... H05B 33/0815; H05B 33/0818; H05B 37/02; B60Q 1/18; B62K 5/025
USPC .................... 315/153, 82; 180/204, 197, 411; 362/459, 227; 340/290, 399
See application file for complete search history.

(56) References Cited

U.S. PATENT DOCUMENTS 5,588,733 A * 12/1996 Gotou ...................... B60Q 1/12 315/79
6,308,126 B2 * 10/2001 Yokoyama .................... 180/197
6,378,641 B1 * 4/2002 Hanaoka .............. B62D 7/1509 180/204
6,578,993 B2 * 6/2003 Kobayashi ............... B60Q 1/12 315/79
6,828,928 B2 * 12/2004 Dubrovin .............. G01S 17/936 315/82
7,241,028 B2 * 7/2007 Hasumi .................... B60Q 1/12 315/82
2005/0246152 A1 * 11/2005 Kokatsu ................... B62M 6/45 703/22
2010/0213872 A1 * 8/2010 Heider ..................... B60Q 1/12 315/297
2011/0074563 A1 * 3/2011 Chang ...................... B62J 6/003 340/432
2011/0221177 A1 * 9/2011 Srabstein ................ B60R 21/13 280/756
2013/0241414 A1 * 9/2013 Ikeda ....................... B60Q 1/12 315/82
2014/0142780 A1 * 5/2014 Chen .................. B60W 40/072 701/1

* cited by examiner

*Primary Examiner* — Douglas W Owens
*Assistant Examiner* — Syed M Kaiser

(57) ABSTRACT

A light unit for a bicycle includes a main light which has a detector and a micro-calculator located therein. The detector is electrically connected to the micro-calculator. The detector detects the turning angle and the lateral force of the bicycle when the bicycle turns, and sends the turning angle and the lateral force to the micro-calculator. Two secondary lights are located on two sides of the main light. Each of the two secondary lights is electrically connected to the micro-calculator which controls the operation of each of the two secondary lights to provide wider illumination when the bicycle turns.

5 Claims, 5 Drawing Sheets

LIGHT UNIT FOR BICYCLE/MOTORBIKE

BACKGROUND OF THE INVENTION

1. Fields of the Invention

The present invention relates to a light unit, and more particularly, to a light unit for a bicycle or a motorbike, the light unit activates a secondary light when the bicycle or motorbike turns to provide wider illumination area.

2. Descriptions of Related Art

The conventional light unit for a bicycle or a motorbike generally includes only one light which can be activated during night so as to provide an illuminated area in front of the rider. The light unit protects the pedestrians and the rider.

When the bicycle or the motorbike turns, the light unit at the front end of the bicycle or the motorbike can only illuminate the area that is located right head of the rider. When the road curves a larger angle, the road that the bicycle or the motorbike is about to turn is not illuminated, the straight light beam from the light unit of the bicycle or the motorbike obviously cannot let the rider to check the condition of the blind area.

A known light unit includes a light sensor which is electrically connected with a circuit board which is powered by a battery unit. The light bulb is connected with the circuit board. The light sensor sends a signal to the chip on the circuit board to control the operation of the light bulb which may generate a high beam or a low beam accordingly. Nevertheless, the light beam is a straight beam which still cannot illuminate the area that is not located at the axis of the light bulb or the bicycle or the motorbike. When riding on a curved road, the potential risk is still there.

The present invention intends to provide a light unit that activates the secondary light to illuminate the lateral area from the axis of the bicycle or the motorbike so as to eliminate the shortcomings mentioned above.

SUMMARY OF THE INVENTION

The present invention relates to a light unit for a bicycle and comprises a main light which has a detector and a micro-calculator located therein. The detector is electrically connected to the micro-calculator. The detector detects the turning angle and the lateral force of the bicycle when the bicycle turns, and sends the turning angle and the lateral force to the micro-calculator. Two secondary lights are located on two sides of the main light. Each of the two secondary lights is electrically connected to the micro-calculator which controls the operation of each of the two secondary lights. When the bicycle turns to right/left, the secondary light at the right/left side of the main light is activated to provide wider illumination.

Preferably, the micro-calculator has a math/logic unit and a control unit located therein. The math/logic unit calculates the turning angle and the lateral force of the bicycle to obtain a control value which is sent to the control unit to control the secondary lights.

Preferably, the math/logic unit calculates the turning angle and the lateral force of the bicycle is expressed by an equation of $$AngleX \cdot Z = \tan^{-1}\left(\frac{G_x}{\sqrt{G_y^2 + G_z^2}}\right) \cdot \frac{180}{\pi}$$

wherein the $G_x$, $G_y$, $G_z$ are the lateral forces detected by the detector in three directions, the AngleX.Z represents the force vectors of the bicycle swing between an X axis and a Z axis.

Preferably, a driver is connected between the micro-calculator and each of the two secondary lights. Each driver is electrically connected to the micro-calculator so as to control the operation of each of the secondary lights.

Preferably, the detector is an acceleration speed meter.

The advantages of the present invention are that when the bicycle turns to right/left, the detector detects the turning angle and the lateral force of the bicycle, the results of the detection are sent to the math/logic unit of the micro-calculator, so that when the control unit receives the result from the math/logic unit, the secondary light at the right/left side of the main light is activated to provide wider illumination.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
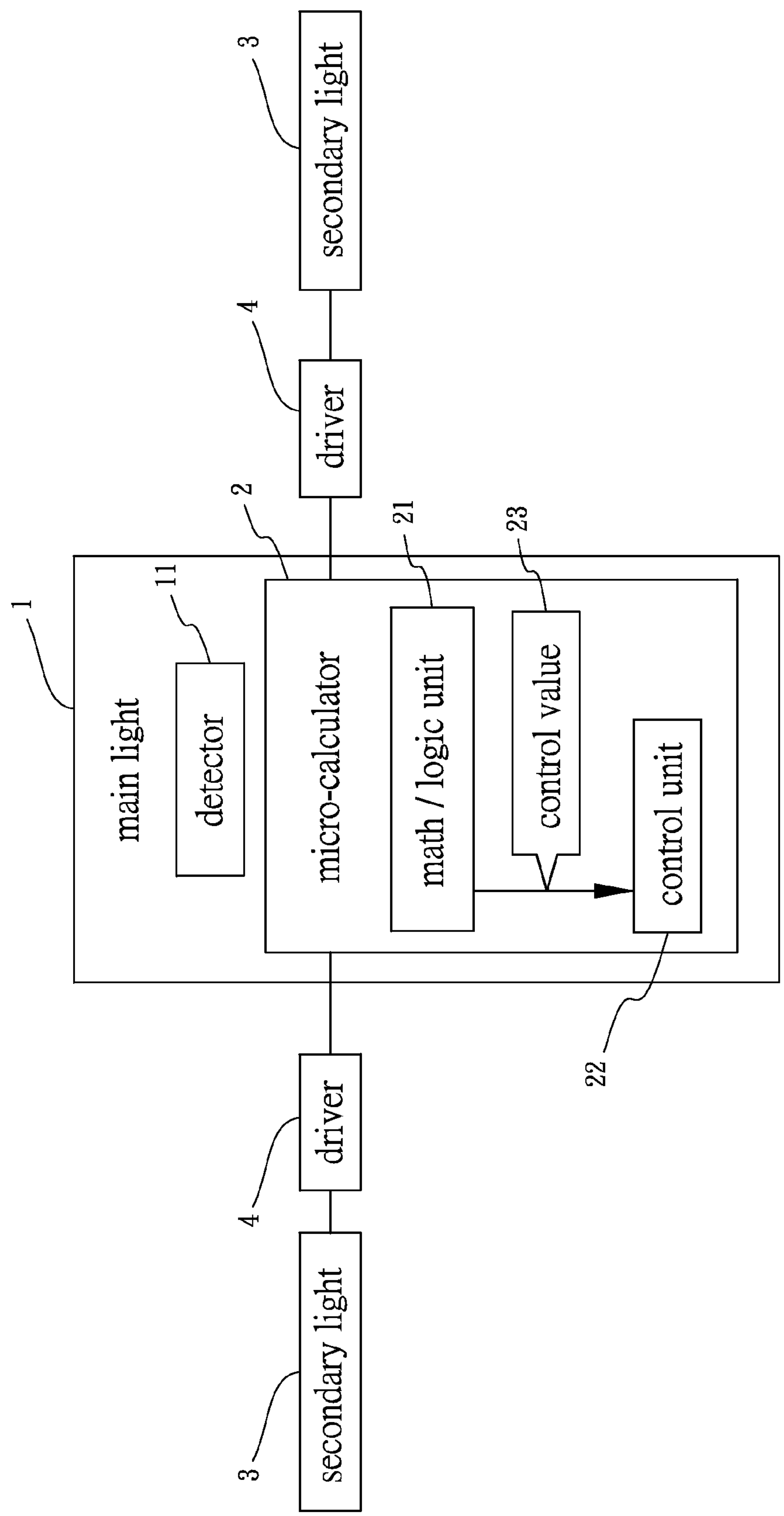
FIG. 1 shows the block diagram of the operation of the light unit of the present invention.

Referring to FIGS. 1 to 5, the light unit of the present invention can be used on any type of vehicle such as a bicycle 10 or a motorbike. The light unit of the present invention comprises a main light 1 and two secondary lights 3 located on two sides of the main light 1. A detector 11 and a micro-calculator 2 are located in the main light 1. The detector 11 is electrically connected to the micro-calculator 2. The detector 11 detects the turning angle and the lateral force of the bicycle 10 when the bicycle 10 turns. The detected turning angle and the lateral force of the bicycle 10 are then sent to the micro-calculator 2.

Each of the two secondary lights 3 is electrically connected to the micro-calculator 2 which controls the operation of each of the two secondary lights 3 to provide wider illumination when the bicycle 10 turns. When the bicycle turns to right/left, the secondary light 3 at the right/left side of the main light 1 is activated to provide wider illumination. In detail, when the bicycle turns to right/left, the detector 11 detects the turning angle and the lateral force of the bicycle 10, and the results are sent to the micro-calculator 2 to activate the secondary light 3 at the right/left side of the main light 1 such that the illuminated area is extended to the right/left side of the bicycle 10 to allow the rider to see the road situation before the bicycle actually arrive that portion of the road. The feature of the light unit of the present invention provides a significant assistance when the bicycle 10 is operated on a curved road, the straight light beam from the main light 1 cannot illuminate the portion of the curved road, the secondary light 3 illuminates that area in time.

In order to calculate the lateral force and the turning angle, the micro-calculator 2 has a math/logic unit 21 and a control unit 22 located therein. The math/logic unit 21 calculates the turning angle and the lateral force of the bicycle 10 to obtain a control value 23 which is sent to the control unit 22 to control the secondary lights 3. The math/logic unit 21 calculates the turning angle and the lateral force of the bicycle 10 is expressed by an equation of $$AngleX \cdot Z = \tan^{-1}\left(\frac{G_x}{\sqrt{G_y^2 + G_z^2}}\right) \cdot \frac{180}{\pi}$$

wherein the $G_x$, $G_y$, $G_z$ are the lateral forces detected by the detector 11 in three directions, the AngleX.Z represents the force vectors of the bicycle 10 swing between an X axis and a Z axis.

Figure 2:
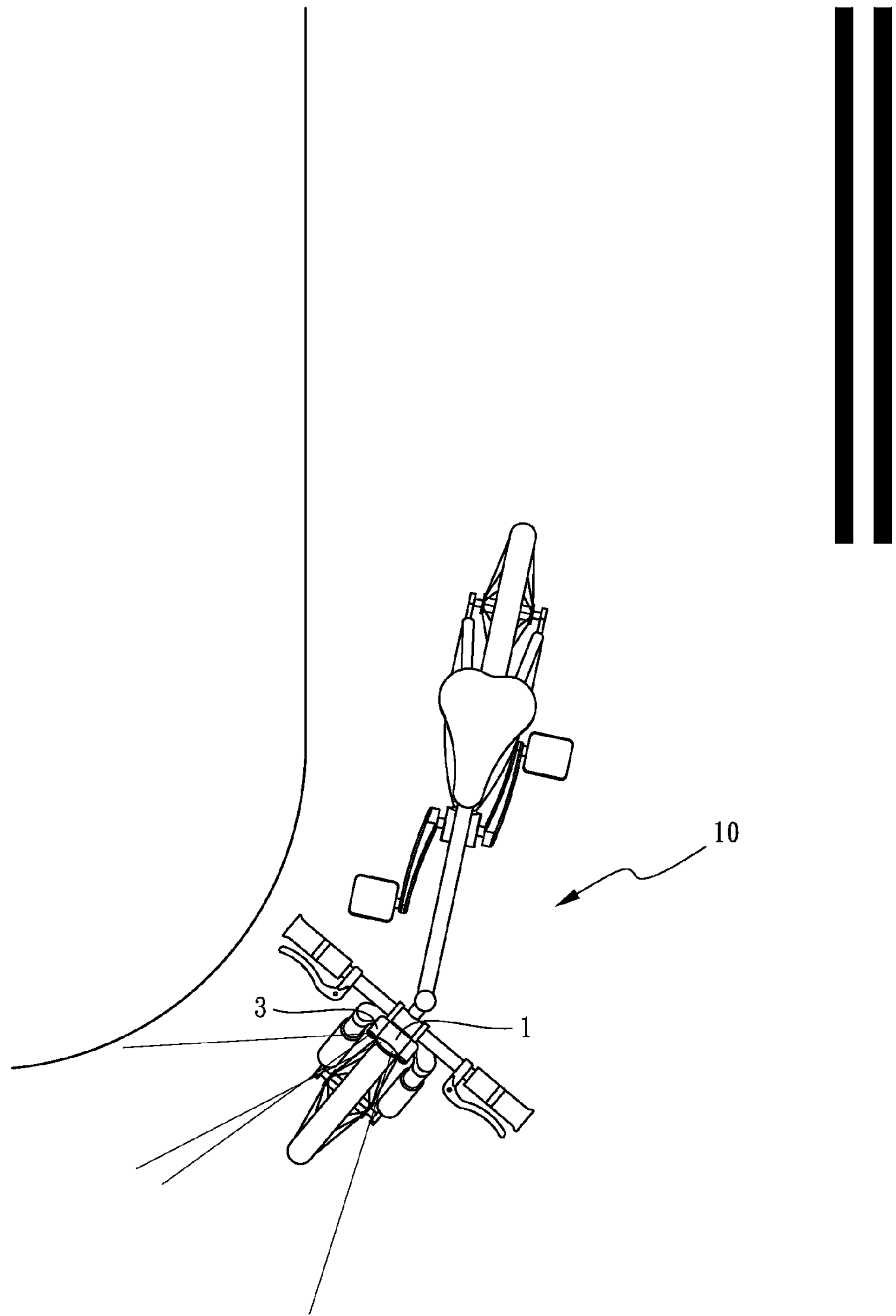
FIG. 2 shows the operation of the secondary light when the bicycle turns right.
Figure 3:
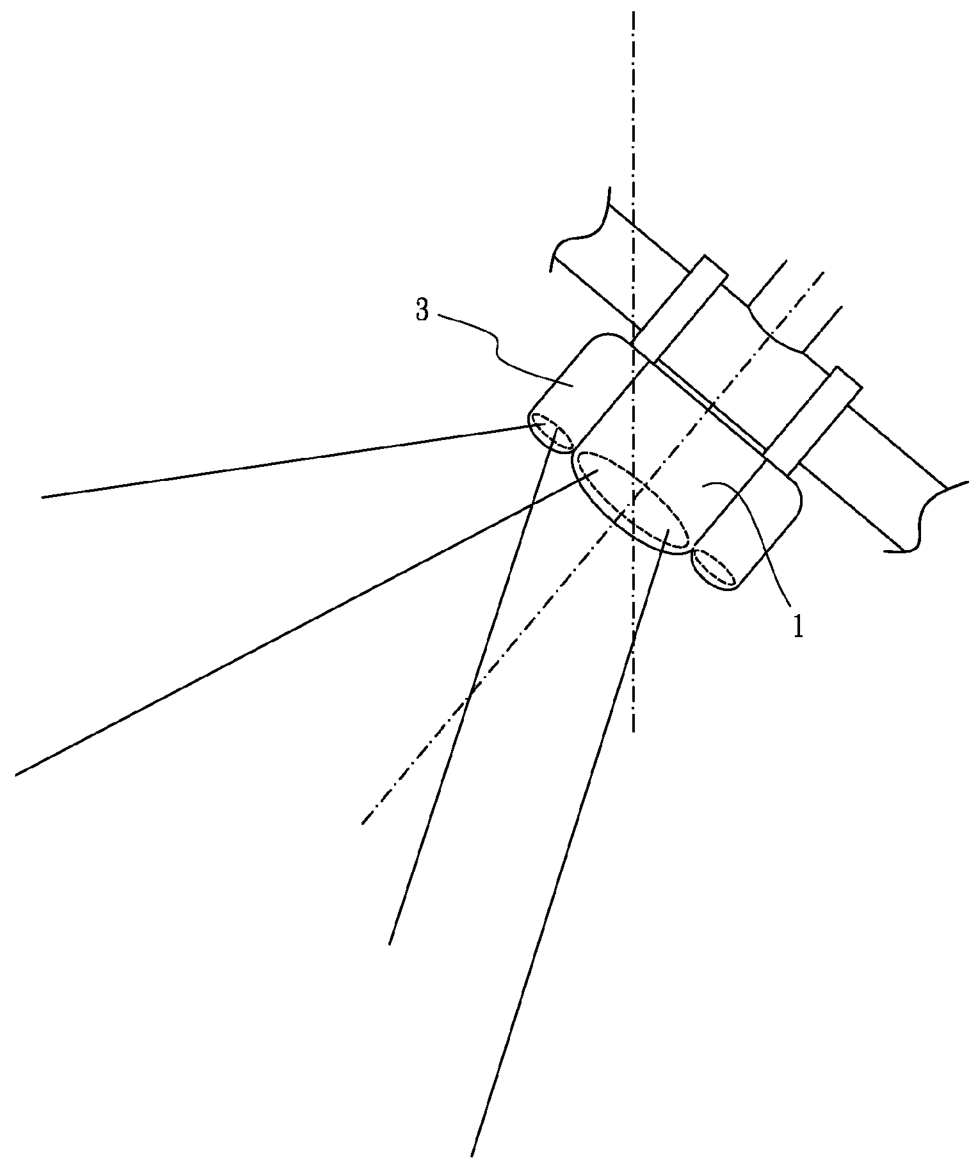
FIG. 3 is an enlarged view to show the secondary light when the bicycle turns right.
Figure 4:
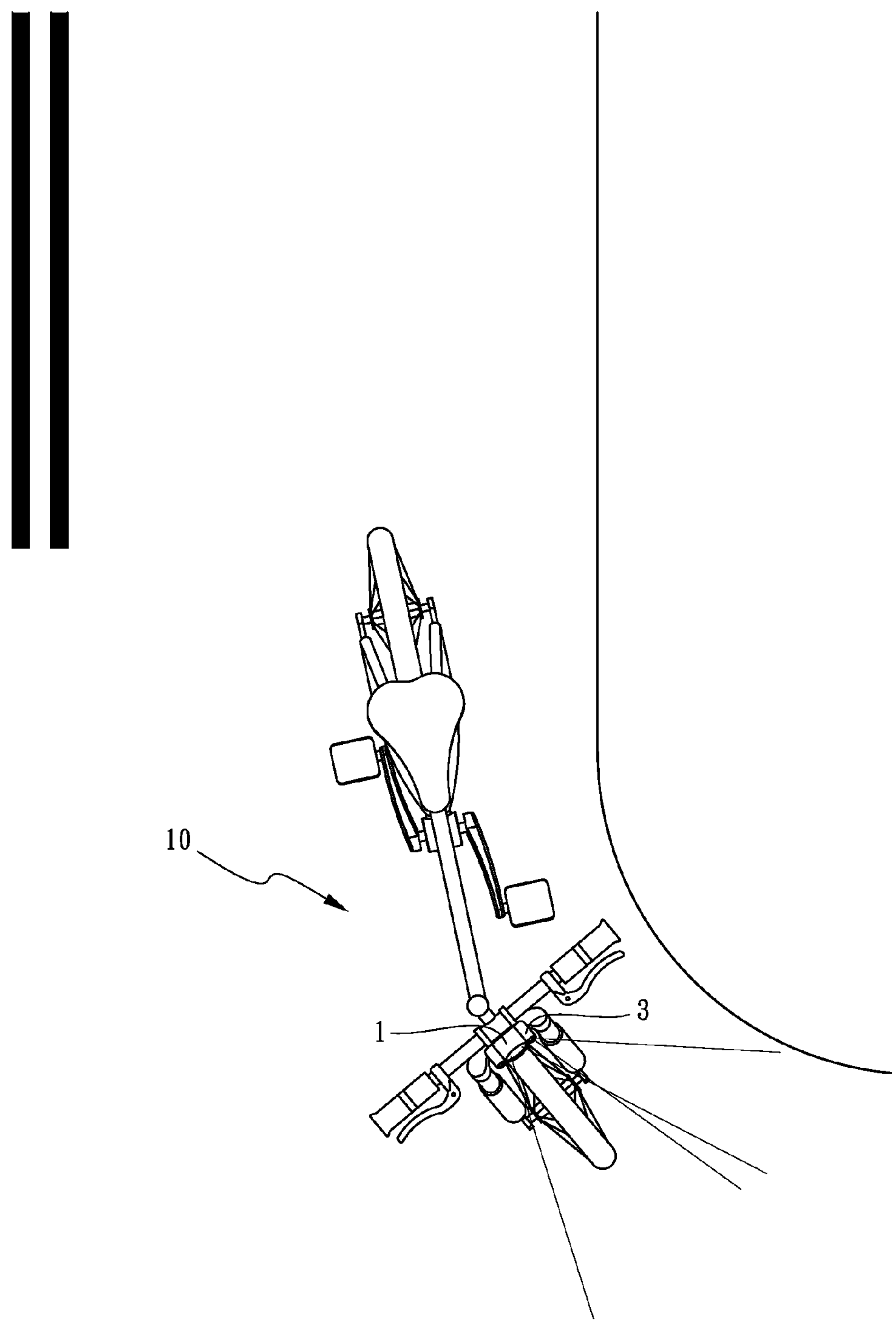
FIG. 4 shows the operation of the secondary light when the bicycle turns left.
Figure 5:
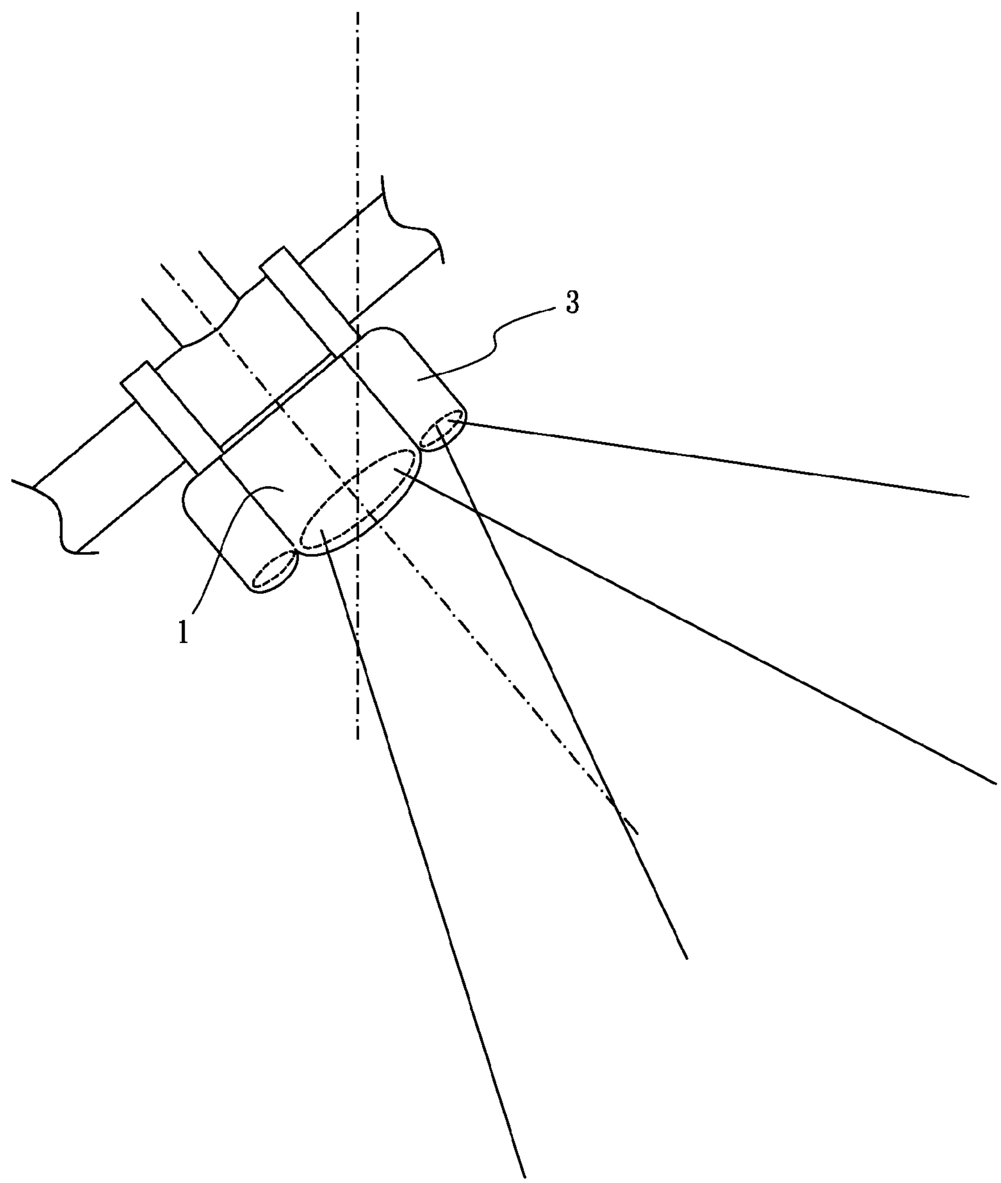
FIG. 5 is an enlarged view to show the secondary light when the bicycle turns left.

The present invention detects the lateral force in the direction along the X axis and the direction along the Z axis. By the calculation through the equation mentioned above, the total lateral force can be obtained. For example, as shown in FIGS. 2, 3, when the bicycle 10 turns right and the total lateral force is calculated to be larger than 1 G, and the turning angle of the bicycle 10 is larger than the pre-set turning angle in the micro-calculator 2, the results calculated from the math/logic unit 21 are sent to the control unit 22. The control unit 22 activates the secondary light 3 at the right of the main light 1, so that the rider can see the situation on the right side of the bicycle.

Similarly, as shown in FIGS. 2, 3, when the bicycle 10 turns left and the total lateral force is calculated to be larger than 1 G, and the turning angle of the bicycle 10 is larger than the pre-set turning angle in the micro-calculator 2, the results calculated from the math/logic unit 21 are sent to the control unit 22. The control unit 22 activates the secondary light 3 at the left of the main light 1, so that the rider can see the situation on the left side of the bicycle.

A driver 4 is connected between the micro-calculator 2 and each of the two secondary lights 3. Each driver 4 is electrically connected to the micro-calculator 2 so as to control the operation of each of the secondary lights 3.

The detector 11 is an acceleration speed meter which is generally called as inertial sensor which is used to detect the rate of speed change of an object. The inertial sensor is used to detect the impact force and distance of the use of safety bag of vehicles. Thanks to the technology of MEMS, the detector 11 can be compact, reliable and low-power consumption. When the acceleration speed meter is moved with an object by a foreign force, the mass block moves in an opposite direction by the inertial force. When the bicycle 10 turns, the bicycle is the mass block which moves toward the opposite direction by the inertial force so that the acceleration speed meter is able to detects the lateral force and the turning angle.

While we have shown and described the embodiment in accordance with the present invention, it should be clear to those skilled in the art that further embodiments may be made without departing from the scope of the present invention.

What is claimed is:

1. A light unit comprising:

a main light (1) having a detector (11) and a micro-calculator (2) located therein, the detector (11) electrically connected to the micro-calculator (2), the detector (11) detecting a turning angle and a lateral force of a bicycle (10) and sending the turning angle and the lateral force to the micro-calculator (2), and two secondary lights (3) located on two sides of the main light (1), each of the two secondary lights (3) electrically connected to the micro-calculator (2) which controls operation of each of the two secondary lights (3) to provide wider illumination when the bicycle (10) turns.

2. The light unit as claimed in claim 1, wherein the micro-calculator (2) has a math/logic unit (21) and a control unit (22) located therein, the math/logic unit (21) calculates the turning angle and the lateral force of the bicycle (10) to obtain a control value (23) which is sent to the control unit (22) to control the secondary lights (3).

3. The light unit as claimed in claim 2, wherein the math/logic unit (21) calculates the turning angle and the lateral force of the bicycle (10) is expressed by an equation of $$AngleX \cdot Z = \tan^{-1}\left(\frac{G_x}{\sqrt{G_y^2 + G_z^2}}\right) \cdot \frac{180}{\pi}$$

wherein the $G_x$, $G_y$, $G_z$ are the lateral forces detected by the detector (11) in three directions, the AngleX.Z represents the force vectors of the bicycle (10) swing between an X axis and a Z axis.

4. The light unit as claimed in claim 1, wherein a driver (4) is connected between the micro-calculator (2) and each of the two secondary lights (3), each driver (4) is electrically connected to the micro-calculator (2) so as to control the operation of each of the secondary lights (3).

5. The light unit as claimed in claim 1, wherein the detector (11) is an acceleration speed meter.

* * * * *